United States Patent [19]

Taylor

[11] 3,935,337

[45] Jan. 27, 1976

[54] PREPARATION OF LIQUID CRYSTAL CONTAINING POLYMERIC STRUCTURE

[75] Inventor: Lynn J. Taylor, Toledo, Ohio

[73] Assignee: Owens-Illinois, Inc., Toledo, Ohio

[22] Filed: Nov. 7, 1973

[21] Appl. No.: 413,655

Related U.S. Application Data

[63] Continuation of Ser. No. 331,445, Feb. 12, 1973, abandoned, which is a continuation of Ser. No. 121,156, Feb. 4, 1971, abandoned.

[52] U.S. Cl. .......... 427/180; 252/408; 350/160 LC; 427/372; 427/384
[51] Int. Cl.² ................ C09K 3/34; C09K 11/06
[58] Field of Search ............... 117/138.8 B, 123 C; 252/408, 300, 299; 350/160 R, 160 P, 160 LC; 250/331

[56] References Cited
UNITED STATES PATENTS

| | | | |
|---|---|---|---|
| 3,114,836 | 12/1963 | Fergason et al. | 250/83 |
| 3,529,156 | 9/1970 | Fergason et al. | 250/83 |
| 3,578,844 | 5/1971 | Churchill et al. | 350/160 LC |
| 3,585,381 | 6/1971 | Hodson et al. | 250/47 |
| 3,600,060 | 8/1971 | Churchill et al. | 350/160 |
| 3,620,889 | 11/1971 | Baltzer | 161/5 |
| 3,663,390 | 5/1972 | Fergason et al. | 204/158 |
| 3,697,297 | 10/1972 | Churchill et al. | 106/131 |
| 3,766,061 | 10/1973 | Mahler et al. | 252/1 |
| 3,804,618 | 4/1974 | Forest et al. | 96/1 R |

Primary Examiner—P. E. Willis, Jr.
Attorney, Agent, or Firm—Donald Keith Wedding

[57] ABSTRACT

There is disclosed the preparation of a liquid crystal containing structure by incorporating a liquid crystal substance into a polymeric matrix so as to form a thin, layer-like structure of controlled thickness. The resulting structure is highly suitable for use in display and/or memory devices or other devices utilizing liquid crystal properties.

5 Claims, No Drawings

PREPARATION OF LIQUID CRYSTAL CONTAINING POLYMERIC STRUCTURE

RELATED APPLICATIONS

This is a continuation of copending U.S. Pat. application Ser. No. 331,445, filed Feb. 12, 1973, which is a continuation of abandoned U.S. Pat. application Ser. No. 121,156, filed Feb. 4, 1971 (now abandoned).

THE INVENTION

This invention relates to the preparation of electronic devices capable of display and/or memory functions and characteristics. More particularly, this invention relates to the preparation of a mesomorphic material containing structure suitable for use in an electronic display and/or memory device.

Mesomorphic materials, typically referred to as liquid-crystal materials, are organic compounds in a transition state between crystalline solid and normal isotropic liquid forms. Such materials are well known in the prior art. Likewise, it is known in the prior art to use liquid crystals in electronic display or memory devices.

Such devices typically comprise a thin layer of liquid crystals sandwiched between two sheets of glass. Normally, the thin layer of liquid crystal material is clear, but when an electric field is applied to it, some portions or regions of the material become turbulent so as to scatter light. By controlling the size and shape of the turbulent regions, images can be formed. Primarily, this effect is obtained by use of liquid-crystal materials of the nematic type.

In one particular embodiment, a liquid-crystal material is sandwiched as a dielectric in a parallel plate capacitor with one electrode transparent and the other electrode either transparent or reflecting. The liquid is kept between the electrodes by capillary action, since electrode spacings are of the order of ½ mil. An applied d.c. or low-frequency (less than 100 Hz.) field of more than 30,000 volts per centimeter changes the cell from transparent to turbulent in a few milliseconds. Depending upon the liquid crystal composition, the opaque effect may remain even after the field is removed. In other words, an optical signal may be maintained with no applied power. The cell can be turned clear again by applying a high-frequency (greater than 700 Hz.) signal. The sample remains clear after the signal is removed.

Additional embodiments of liquid-crystal electrooptical devices are disclosed and illustrated in U.S. letters Pat. Nos. 3,401,262 and 3,410,999; Proceedings of the IEEE, Vol. 56, No. 12, Dec., 1968, pages 2146 to 2149; The Glass Industry, August, 1968, pages 423 to 425; Chemical and Engineering News, September 30, 1968, pages 32 and 33; Physics Today, July, 1970, pages 30 to 36; Electronics, July 6, 1970, pages 64 to 70; U.S. letters Pat. No. 3,322,485 to Williams.

In accordance with this invention, a liquid-crystal substance is incroporated into a polymeric matrix so as to form a thin layer-like structure of controlled thickness, which structure is highly suitable for use in display devices or other devices utilizing liquid-crystal properties.

In the practice of this invention, the liquid-crystal substance and the matrix polymer are so selected such that the liquid-crystal substance exists as a dispersed phase within the polymeric matrix; that is, each should be chemically and physically inert, and preferably insoluble, relative to the other.

The liquid-crystal substance may be incorporated into the polymeric matrix via any convenient procedure including not by way of limitation:

a. Casting a film from a polymer solution containing liquid crystals;

b. Blending liquid crystals with molten polymer, , followed by extrusion, pressing, casting, coating, etc;

c. Application of liquid crystals to the surface of the polymer following by heating so as to promote diffusion;

d. Mixing liquid crystals with a polymerizable monomer or prepolymer followed by polymerization;

e. Use of a polymer (or polymerizable monomer) as the medium (solvent) in which liquid-crystal synthesis is carried out.

In one embodiment hereof, a material capable of forming liquid crystals is incorporated in a polymeric binder by dissolving or dispersing the former material in a polymer solution or molten polymer, then fabricating the polymer by a suitable technique (solution casting, molding, extrusion, etc.). Following solvent evaporation and/or cooling of molten polymer, the polymer will act as a binder and protective matrix for the liquid crystals.

In certain cases, (e.g., when polymer and mesomorphic material are incompatible in the appropriate temperature range) the polymer/liquid crystal composite will still possess the useful properties typical of liquid crystals. Consequently, such composites should prove useful in such applications as display devices, temperature indicators, etc.

The principles discussed above could also be applied in related ways, such as the use of prepolymers which subsequently react to form the polymeric binder, or the use of materials in the form of a paint which subsequently dries, or cures, to form the desired polymer/liquid crystal composite.

The practice of this invention comprises using liquid crystals of any suitable molecular alignment -- nematic, smectic, and/or cholesteric -- depending upon the desired use.

Typical organic classes of liquid crystal forming materials contemplated comprise both aromatic and aliphatic organic compounds such as benzylideneanilines generally prepared from the reaction of para-substituted benzaldehyde and parasubstituted aniline; N-(p-alkoxybenzylidene)-p-aminostyrenes prepared from the reaction of the appropriate aldehyde with p-aminostyrene; the cholesteric compounds such as those derived from cholestene or cholesterol, e.g. esters from reaction of cholesterol and inorganic acids; organic esters of cholesterol; ethers of cholesterol; carbonates and carbamates of cholesterol; alkyl amides and aliphatic secondary amines derived from 3-betamino delta-5-cholestene; derivatives of beta sitosterol; active amyl ester of cyano benzylidene amino-cinnamate; P-phenylene containing compounds such as p-phenylene p-alkoxybenzoates; aminoacetophenones; aminopropiophenones; phenylenediamines; chlorophenylenediamines; terephthals; p,p'-disubstituted bibenzyls; p,p'-disubstituted stilbenes; p,p'-disubstituted diphenylacetylenes; p,p'-disubstituted azobenzenes; p,p'-disubstituted azoxybenzenes; p,p'-disubstituted dibenzalazines; p,p'-disubstituted-1,4-diphenylbutadienes; p,p'-diisubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

Specific liquid-crystal compounds include ethyl p-4-ethoxybenzylideneaminocinnamate; p,p'-azoxybenzoic acid diethyl ester; N-(p-methoxybenzylidene)-p-aminostyrene; N-(p-butoxybenzylidene)-p-aminostyrene; N-(p-octadecyloxybenzylindene-p-aminostyrene; p-azoxyanisole; p-hexyloxybenzalazine; p-azoxyphenetole; p-anisylidene-p-biphenylamine; p-ethoxybenzylindene-p-biphenylamine; p-anisylidene-p-aminophenyl acetate; p-ethoxybenzylidene-p-aminophenyl acetate; p-n-hexyloxybenzylidene-p-aminophenyl acetate; deca-2,4, dienoic acid; 4,4' di-n-heptoxyazoxybenzene; 4,4' di-n-hexoxyazoxybenzene; 4,4' di-n-pentoxyazoxybenzene; 4,4' di-n-butoxyazoxybenzene; 4,4'diethoxyazoxybenzene; undeca 2,4-dienoic acid; nona-2,4-dienoic acid; 4,4'-dimethoxystilbene; 2,5-di(p-ethoxybenzylidene)cyclopentanone; 2,7-di-(benzylideneamino) fluorene; 2-p-methoxybenzylideneaminophenanthrene; 4-methoxy-4''-nitro-p-terphenyl; 4-p-methoxybenzylideneaminobiphenyl; 4,4'-di(benzylideneamino)biphenyl; p-n-hexylbenzoic acid; p-n-propoxybenzoic acid; trans-p-methoxycinnamic acid; 6-methoxy-2-naphthoic acid; p-phenylene di-p-anisate; p-phenylene di-p-ethoxybenzoate; p-phenylene di-p-n-hexyloxybenzoate; p-phenylene di-p-n-heptyloxybenzoate; p-phenylene di-p-n-octyloxybenzoate; 1,4-bicyclo [2.2.2.]octylene di-p-anisate; 1,4-bicyclo[2.2.2]octylene di-p-n-octyloxybenzoate; trans-1,4-cyclohexylene di-p-anisate; trans-1,4-cyclohexylene di-p-n-butoxybenzoate; 4,4'-di(p-methoxybenzylideneamino)dibenzyl; p,p'-diacetoxystilbene; 1,2-di(p-methoxyphenyl)-acetylene; p-(p-acetoxyazo)benzoic acid; 1,4-di-(p-methoxyphenyl)-butadiene; p-anisal-p-anisidine; p,p'-dimethoxydibenzal-1,4-naphthalenediamine; p-n-butylbenzoic acid; p,p'-di-n-butyldiphenylpyridazine; p-(p-cyanobenzal)anisidine; p-(p-methoxybenzoxy)benzoic acid; anisal-p-aminoazobenzene; 1-(4'-anisalamino)-4-phenylazonaphthalene; N-(p-methoxybenzylidene)-p-n-butylaniline; N-(p-n-octyloxybenzylidene)-p-n-butylaniline; p-anisylidene-p-phenylazoaniline; N,N'-dibenzylidenebenzidine; N,N'-di(p-n-hexyloxybenzylidene) benzidine; p-bis(-heptyloxybenzoyloxy)benzene; p-n-propoxybenzoic acid; p-n-butoxybenzoic acid; p-n-amyloxybenzoic acid; p-n-hexyloxybenzoic acid; p-n-heptyloxybenzoic acid; p-n-octyloxybenzoic acid; butyl-p-(p-ethoxyphenoxycarbonyl)phenyl carbonate; p-(p-ethoxyphenylazo)phenyl heptanoate; 4-[(p-hexyloxycarbonyloxybenzylidene)amino]-1-pentyloxybenzene; N-[p-(pentyloxycarbonyloxy)benzylidene]-p-anisidine; p-[(p-butoxyphenyl)azo]phenyl butyl carbonate; p-(p-ethoxyphenylazo)phenyl hexanoate; p-(p-ethoxyphenylazo)phenyl valerate; p-[(p-ethoxybenzylidene)amino]benzonitrile; p-[(p-methoxybenzylidene)amino]benzonitrile; ethyl p-[(p-methoxybenzylidene)amino]cinnamate; p-(p-ethoxyphenylazo)-phenyl crotonate; p-[(p-methoxybenzylidene)amino]-phenyl p-toluate; p-[(p-methoxybenzylidene)amino]-phenyl benzoate; p-[(p-ethoxybenzylidene)amino]phenyl benzoate; N,N'-di(p-methoxybenzylidene)α,α'-biptoluidine; p-anisalazine; 4-acetoxy-3-methoxycinnamic acid; p-acetoxycinnamic acid; 4'-[(p-pentyloxycarbonyloxybenzylidene)amino]valerophenone; diethyl p,p'-azoxydicinnamate; 4-butoxybenzylidene-4'-aminoacetophenone; 4-decyloxybenzylidene-4'-aminoacetophenone; 4-dodecyloxybenzylidene-4'-aminoacetophenone; 4-heptyloxybenzylidene-4'-aminoacetophenone; 4-hexyloxybenzylidene-4'-aminoacetophenone; 4-methoxybenzylidene-4'-aminoacetophenone; 4-nonyloxybenzylidene-4'-aminoacetophenone; 4-octyloxybenzylidene-4'-aminoacetophenone; 4-pentyloxybenzylidene-4'-aminoacetophenone; 4-propoxybenzylidene-4'-aminoacetophenone; 4-butoxybenzylidene-4'-aminopropiophenone; 4-heptyloxybenxylidene-4'-aminopropiophenone; 4-hexyloxybenzylidene-4'-aminopropiophenone; 4-methoxybenzylidene-4'-aminopropiophenone; 4-nonyloxybenzylidene-4'-aminopropiophenone; 4-octyloxybenzylidene-4'-aminopropiophenone; 4-pentyloxybenzylidene-4'-aminopropiophenone; 4-propoxybenzylidene -4'-aminopropiophenone; bis-(4-bromobenzylidene)-2-chloro-1,4-phenylenediamine; bis-(4-chlorobenzylidene)-2-chloro-1,4-phenylenediamine; bis-(4-n-decyloxybenzylidene)-2-chloro-1,4-phenylenediamine; bis-(4-n-dodecyloxybenzylidene)-2-chloro-1,4 -phenylenediamine; bis-(4-n-hexyloxybenzylidene)-2-chloro-1,4-phenylenediamine; bis-(4-methoxybenzylidene)-2-chloro-1,4-phenylenediamine; bis-(4-nonyloxybenzylidene)-2-chloro-1,4-phenylenediamine; bis-(4-n-octyloxybenzylidene)-2-chloro-1,4-phenylenediamine; bis-(4-n-pentyloxybenzylidene)-2-chloro-1,4-phenylenediamine; bis-(4-bromobenzylidene)-1,4-phenylenediamine; bis-(4-chlorobenzylidene)-1,4-phenylenediamine; bis-(4-n-decyloxybenzylidene)-1,4-phenylenediamine; bis-(4-n-dodecyloxybenzylidene)-1,4-phenylenediamine; bis-(4-fluorobenzylidene)-1,4-phenylenediamine; bis-(4-n-heptyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-octyloxybenzylidene)-1,4-phenylenediamine; bis-(4-n-pentyloxybenzylidene)-1,4-phenylenediamine; terephthalbis-(p-bromoaniline); terephthalbis-(p-chloroaniline); terephathalbis-(p-fluoroaniline); terephthalbis-(p-iodoaniline); cholesteryl myristate; cholesteryl oleate; cholesteryl palmitate; cholesteryl pelargonate; cholesteryl phenylacetate; cholesteryl stearate; p-(4-cyanobenzalamino)-cinnamic acid, active amyl ester; N-(p-cyanobenzal)-p-anisidine; 4-cyanobenzoic acid; p-methoxycinnamic acid; N,N'-terephthalylidenedi-p-toluidine; cholesteryl bromide; cholesteryl nitrate; cholesteryl crotonate; cholesteryl propionate; cholesteryl valerate; cholesteryl hexanoate; cholesteryl docosonoate; cholesteryl vaccenate; cholesteryl chloroformate; cholesteryl linoleate; cholesteryl linolenate; cholesteryl erucate; cholesteryl butyrate; cholesteryl caprate; cholesteryl laurate; cholesteryl myristate; cholesteryl clupanodonate; cholesteryl decyl ether; cholesteryl lauryl ether; cholesteryl dodecyl ether; cholesteryl decyl carbonate; cholesteryl methyl carbonate; cholesteryl ethyl carbonate; cholesteryl butyl carbonate; cholesteryl docosonyl carbonate; cholesteryl cetyl carbonate; cholesteryl oleyl carbonate; cholesteryl heptyl carbamates; cholesteryl acetate; cholesteryl acetoacetate; cholesteryl benzoate; cholesteryl n-butyrate; cholesteryl caproate; cholesteryl caprylate; cholesteryl chloroacetate; cholesteryl chloroformate; cholesteryl cinnamate; cholesteryl n-decylate; cholesteryl 2,4-dichlorobenzoate; cholesteryl formate; cholesteryl n-heptylate; cholesteryl hydrocinnamate; cholesteryl hydrogen phthalate; cholesteryl hydrogen succinate; cholesteryl isobutyrate; cholesteryl laurate; cholesteryl nonanoate; cholesteryl chloride; cholesteryl 2-ethylhexyl carbonate; cholesteryl p-nonylphenyl carbonate; cholesteryl 2-(ethoxyethoxy) ethyl carbonate; cholesteryl 2-(2-butoxyethoxy)ethyl carbonate; cholesteryl 2-(2-methoxyethoxy)ethyl carbonate; cholesteryl geranyl carbonate; cholesteryl dodecyl carbonate; cholesteryl 2-butoxyethyl carbonate; cholesteryl octadecyl carbonate; cholesteryl 2-propyn-1-yl carbonate; cholesteryl 2-methoxyethyl carbonate; cholesteryl 3-methoxybutyl carbonate; cholesteryl 2-methyl-2 propen-1-yloxycarbonylethyl carbonate; cholesteryl furfuryl carbonate; cholesteryl decyl carbonate; cholesteryl methallyl carbonate; cholesteryl 2-benzyloxy carbonate;

Materials suitable for use as the polymeric matrix would include the following: polyethylene; polypropylene; poly(1-butene); poly(4-methyl-1-pentene); polyisobutylene; polystyrene; polybutadiene; polychloroprene; poly(methyl methacrylate); poly(ethyl methacrylate); poly(n-butyl methacrylate); poly(vinyl acetate); poly(vinyl alcohol); poly(vinyl chloride); poly(vinylidene chloride); poly(vinyl fluoride); poly(vinylidene fluoride); poly(caprolactam); poly(hexamethyleneadipamide); poly(ethylene terephthalate); polyoxymethylene; poly(ethylene oxide); poly(propylene oxide); poly(phenylene oxide); Bisphenol A polycarbonate; dimethyl polysiloxane; poly(N-vinylpyrrolidinone); alkyd resins; poly(ethyleneimine); ethyl cellulose; methyl cellulose; hydroxyethyl cellulose; hydroxypropyl cellulose; sodium carboxymethyl cellulose; cellulose nitrate; poly(acrylic acid) and its salts; poly(methacrylic acid) and its salts; polyacrylamide; polyacrylonitrile; poly(methacrylonitrile); poly(caprolactone); Bisphenol A - epichlorohydrin condensates (epoxy resins); ethylene-ethyl acrylate copolymers; ethylene-propylene copolymers; ethylene-vinyl acetate copolymers; vinyl chloride-vinyl acetate copolymers; styrene-butadiene copolymers; styrene-isoprene copolymers; styrene-acrylonitrile copolymers; styrene-methyl methacrylate copolymers; polyvinyl formal; polyvinyl butyral; poly(methyl acrylate); poly(ethyl acrylate); poly(vinyl propionate); ethylene - acrylic acid copolymers and their salts; cellulose acetate; cellulose propionate; cellulose acetate butyrate; poly(diallyl phthalate); poly(decamethylene adipamide); poly(11-aminoundecanoic acid); poly(12-aminododecanoic acid); poly(methyl vinyl ether); poly(isobutyl vinyl ether).

Another method of incorporation of liquid crystals into polymer matrices involves the preparation of a mixture of the liquid crystal and a polymerizable monomer or prepolymer, followed by polymerization. Incorporation of liquid crystals into most of the aforementioned polymers can be accomplished in this way. In addition, this technique permits the "embedment" of liquid crystals in matrices of thermosetting plastics, including the following classes of materials: phenol-formaldehyde resins; urea-formaldehyde resins; melamine-formaldehyde resins; epoxy resins; polyurethanes; unsaturated polyesters; thermosetting acrylic resins.

By careful choice of materials, it should be possible to modify electrical and optical properties of the polymer/liquid crystal layer without affecting typical liquid crystal phenomena, by adding other materials (dyes, additives to increase electrical conductivity, etc.) which are compatible with the polymer but not with the liquid crystals, or vice versa.

The resulting liquid-crystal containing structure, prepared in accordance with this invention, may be rigid or flexible depending upon the use.

Typical uses include display/memory panel devices, e.g. of the type as described hereinbefore.

It is further contemplated that the liquid-crystal structure may be used as a temperature indicator, especially liquid crystals of the nematic or cholesteric type. For example, a sheet or film (rigid or flexible) of the composite material could be applied directly to the body of an animal, e.g. human skin.

Another use includes the detection of gases, e.g. air pollutants. Certain liquid crystals undergo changes in color, opacity, etc., in the presence of certain gases.

In one particular embodiment hereof, the structure is used as a chromatographic stationary phase for the separation of gaseous phase materials. Such embodiment comprises positioning the liquid-crystal containing structure transversely in a gas stream to determine gas transport rates, e.g. solubility factors, etc., and also to separate gases in the stream. In the practice of such embodiment, nematic crystals in particular may exhibit unusual selectivity factors. For example, para-xylene has more affinity for nematic liquid crystals than does ortho-xylene.

Reference is made to the hereinafter EXAMPLE which represents one of the best embodiments for practice of this invention.

EXAMPLE

A solution of 0.1 gram of N,N'-bis(p-n-octyloxybenzylidene)-2-chloro-1,4-phenylenediamine and 0.1 gram of poly (ethylene oxide)(Polyox WSR N-10) in 1.0 gram of dry methylene chloride was cast onto a glass substrate and allowed to evaporate.

The isolated (pure) liquid crystal undergoes a characteristic liquid-crystal isotropic phase transition clearing point at about 165° – 170°C. Visual observation of a heated sample of the resulting film composite indicated that the film had a similar clearing point characteristic; the existence of this transition in the film was also detected by Differential Thermal Analysis.

When the film was placed between two conductive transparent tin oxide-coated glass plates, warmed to about 60°C., and subjected to a voltage difference of 200 volts, a "dynamic scattering effect" was visually observed.

In the practice of this invention, certain operating parameters may be most suitable.

Accordingly, although a broad range of polymeric molecular weights are contemplated, a preferred MW range is about 10,000 to 200,000.

It is contemplated that the liquid-crystal substance may be a homogeneous or heterogeneous mixture of two or more components. Likewise, the finally prepared structure may be of any suitable planar or solid shape and/or configuration as well as flat, layer-like. When the structure is a layer-like film, as in an electronic display device, the overall film thickness of the active layer (polymeric matrix plus liquid-crystal substance) should range from about 0.25 mil to about 2.5 mils. Furthermore, the active film layer may be surrounded by adjacently positioned structures of any suitable shape, such as one or more continuous or discontinuous flat layers.

Such adjacent structures may be inactive support bodies, such as sealant layers or transparent layers, or may be active in the overall operation process, such as lenses, circuitry, electrodes, etc. Typical electrode configurations include both the continuous and discontinuous types. In one preferred embodiment there are used two series of parallel-like electrode members, the electrodes of one series being transversely oriented relative to those of the other series. In one highly preferred embodiment, two polymeric matrices are used as dielectric layers in a gaseous discharge device of the types disclosed in U.S. letters Pat. No. 3,499,167 and/or British Pat. No. 1,161,832, both of which are hereby incorporated by reference.

The electrodes may be of any suitable material, e.g. metal or metal oxide, and may be applied to a substrate of any suitable material, e.g. glass, plastic, or ceramic.

In the broad practice hereof, it is contemplated that the polymer and liquid-crystal material may be mixed together in the presence or absence of a solvent. The mixture may be stored in a common container and/or applied in a liquid or solid form to a substrate. In dry form, the resulting mixture may comprise beads, powders, pellets, etc., which may be conveniently stored or used as such.

In the initial formation of the dry or wet mixture, both the polymer and the liquid-crystal material may be solid. Likewise, either or both components may be used above the corresponding softening or melting temperatures.

The preferred weight ratio of liquid-crystal substance to polymeric matrix should range from about 1:4 to about 4:1.

Other possible applications or uses for the structure of this invention include detectors of pressure, structural strain or stress, and ultraviolet radiation.

I claim:

1. A process for preparing a thin, layer-like film structure of controlled thickness suitable for use in electronic display devices comprising providing a polymeric material film, applying a liquid-crystal material to the surface of said polymeric material film and then heating said polymeric film to a temperature sufficient to promote diffusion of said liquid-crystal material therein to form said film structure containing said polymeric material in matrix form with said liquid-crystal material as a dispersed phase embedded in said polymeric material film such that said liquid-crystal material is in intimate contact with said matrix, said polymeric material being chemically and physically inert relative to the contained liquid-crystal material.

2. The invention of claim 1 wherein the liquid-crystal material is nematic, cholesteric, or a mixture of nematic and cholesteric.

3. The invention of claim 2 wherein the film structure has a thickness of about 0.25 mil to about 2.5 mils.

4. The invention of claim 3 comprising the further step of incorporating said film structure between adjacent layers, the adjacent layers comprising plastic, glass, or ceramic.

5. The invention of claim 4 wherein the polymeric matrix has a molecular weight of about 10,000 to about 200,000.

* * * * *